(No Model.)

E. F. MORSE.
COUPLING FOR DRIVE CHAINS.

No. 588,704.　　　　　　　　Patented Aug. 24, 1897.

WITNESSES:
Henry T. Hirsch
Wm. N. Capel

INVENTOR:
Everett F. Morse.
by Townsend & Decker
ATTORNEYS.

UNITED STATES PATENT OFFICE.

EVERETT F. MORSE, OF TRUMANSBURG, NEW YORK.

COUPLING FOR DRIVE-CHAINS.

SPECIFICATION forming part of Letters Patent No. 588,704, dated August 24, 1897.

Application filed February 6, 1895. Serial No. 537,497. (No model.)

*To all whom it may concern:*

Be it known that I, EVERETT F. MORSE, a citizen of the United States, and a resident of Trumansburg, in the county of Tompkins and State of New York, have invented a certain new and useful Coupling for Drive-Chains, of which the following is a specification.

My invention relates to couplings for drive-chains such as may be used in any form of drive-chain in which the succession of links is produced by transverse pins, pintles, rivets, or bars. It especially relates, however, to a particular form of drive-chain patented by me October 24, 1893, under No. 507,153.

The object of the invention is to produce a coupling for a drive-chain such as will enable any one to readily separate and again unite the ends thereof without cutting, disfiguring, or destroying any part of the chain and such as will not change the form or relative location of any of the parts of the chain which engage with the chain or sprocket wheels. Such a coupling is especially useful in chains which are employed upon changeable-gear sprockets, and therefore require frequent changes in length. In chains for this purpose any number of couplings may be employed, as found desirable, to facilitate the removal or insertion of sections of chain of various length.

My invention therefore consists of a drive-chain coupling having a key or clencher extending from one transverse pin or bar to another and secured removably in such position for retaining the coupler in place in the chain.

My invention further consists in the construction and combination of parts hereinafter described, and pointed out in the claims.

Figure 1:
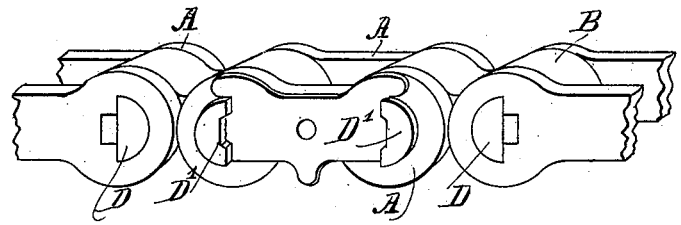
Figure 2:
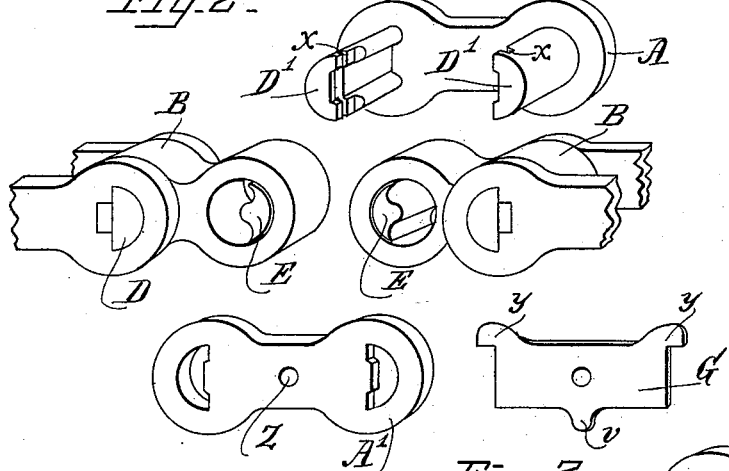
Figure 3:
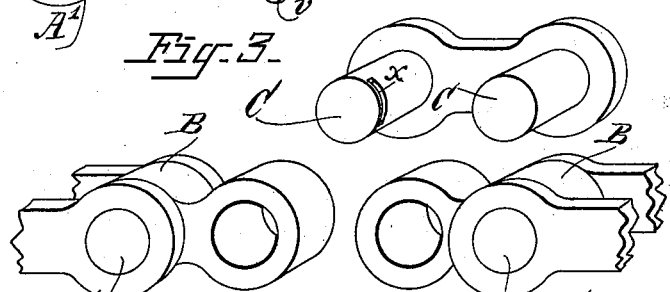
Figure 4:
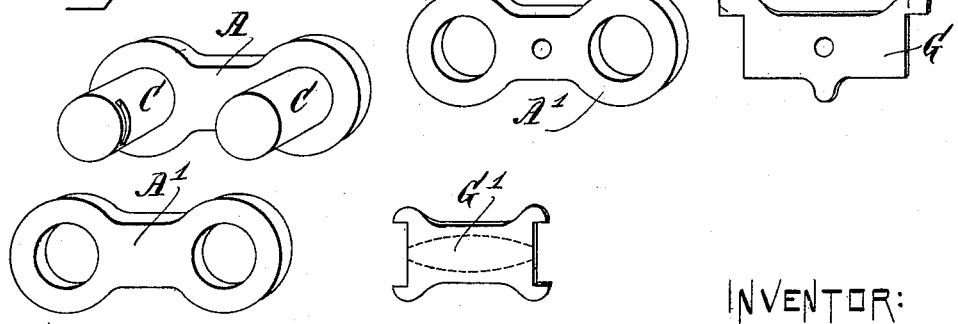

In the accompanying drawings, which form a part of this specification, Figure 1 represents in perspective a section of my patented roller-joint chain above referred to, showing the coupler applied thereto. Fig. 2 represents in perspective said section of chain uncoupled and the parts of the coupling separated. Fig. 3 is a view similar to that of Fig. 2, showing my coupler applied to an ordinary pin-joint chain. Fig. 4 shows a modification of the coupling key or clencher and its mode of application.

My coupling is especially useful in bicycle-chains, and the illustration is by preference made in respect to chains used mainly for that purpose, though its use may obviously be extended to variously-constructed drive-chains used for other purposes.

In the drawings, A indicates the side links of a sprocket-chain, B the middle links, and C the transverse pins or pintles. In my patented chain the pin C of the ordinary chain (shown in Fig. 3) is replaced by a roller-joint consisting, as seen in Fig. 2, of seat-pins D, to which the side links are rigidly secured, and the coacting rolling pins E, resting loosely in the bores of the middle links. For further description of this roller-joint reference is made to the patent above mentioned.

In forming the coupling for the roller-joint chain I prolong two of the seat-pins D, which are connected by a side link A, so that they shall protrude beyond the associate side links A' and nick the facing sides of said pins, as at $x$, close up to the link A'. This link A' is not to be permanently secured to its seat-pins, as is the opposite side link A, but is held securely thereon by means of a spring key or clencher sprung in between the pins D and resting in said nicks $x$. This key or clencher may be of any form and construction which will enable it to hold its seat and perform the function of retaining the link A' in place and yet be readily and easily removed and replaced. I have shown such a key as consisting of a thin plate G, of spring metal, of the thickness of the nicks $x$. This plate I provide with suitable stops for retaining it in place, such as the projections $y$, at the corners of one side, which, in the illustrated position of the chain, rest upon the pins D' and prevent it from dropping any lower, while to prevent said plate from dropping out when the chain is inverted I provide it at the middle of the inner side with a slight projection which when the plate is pushed to place will spring into a corresponding depression $z$ in the side of the link A'.

To facilitate the removal of the key or clencher, a lug, as $v$, may be formed thereon to protrude below the edge of the link A' to afford a surface against which may be applied the pressure necessary to unseat the key. Obviously the retaining projection and its depression $z$ may be dispensed with and the lug $v$ made to perform the function thereof by bending or curving it slightly inward, so that it will spring under the edge of link A' when the clencher is shoved to place.

In applying my coupler to the ordinary sprocket-chain it is only necessary to replace a couple of the pins C by longer ones provided with nicks $x$, drill or punch a depression $z$ in the side link, which is to be left removable, and assemble the parts and retain them in place by inserting the key G or any other form of key or clencher which will hold the coupling in place in the chain and yet be readily removable for uncoupling the chain.

As already stated, the clencher may be of various forms and applied in various ways, and while the forms above described are the ones preferred I have illustrated another simple form in Fig. 4. In this form the key consists of a spring-plate G', forked at each end to straddle the ends of pins C, and in this form the forks or the plane space between the prongs thereof may be made to enter nicks in said pins, the latter construction being the one shown. In this form the key is bowed and sprung into place and requires no depression and projection $z$ to retain it. Obviously instead of forking the ends of the key they may be made narrower than the diameter of the pins C, as indicated in dotted lines, and be sprung into depressions of corresponding dimensions in the pins C in the place of the nicks $x$. These changes and many others may be made in the construction and arrangement of parts without departing from my invention.

To uncouple or open a chain supplied with my coupler, the key or clencher is simply pressed or forced out of its seat, the link A' removed from its pins, and said pins, with their attached link A, withdrawn from the middle links, as shown in Figs. 2 and 3. The coupling operation is performed by simply reversing the steps above enumerated.

This simple form of coupler, which can be easily manipulated by any bicyclist, will enable him to readily remove his chain for cleaning or for sending it away for repairs and enable him to as readily replace said chain or to substitute a new one therefor.

What I claim as my invention is—

1. In a drive-chain coupling, the combination with a side link removable from its transverse pins or bars, of a key or clencher located at the outside of said link and engaging the ends of both of said bars for holding said link in place.

2. In a drive-chain, a coupling consisting of a side link, transverse pins secured thereto, a side link removable from said pins, and a key or clencher seated removably between said pins at the outside of the removable link for the purpose set forth.

3. In a drive-chain coupling, the combination with the transverse pins or bars provided with nicks or depressions at their free ends, of a side link removably fitted to said pins or bars, and a spring key or clencher removably fitted to said nicks or depressions to retain the removable link in place.

4. The combination with the transverse pins provided with nicks at one end and rigidly connected to a side link at the other, of a side link removably fitted to said pins, and a spring key or clencher having its ends fitted in said nicks and provided with stops for retaining it in place.

5. The combination with the side link A, and the nicked transverse pins connected thereto, of the removable side link A', provided with the depression $z$, and the key or clencher G, provided with the stops $y$, and the projection coöperating with the depression $z$, substantially as and for the purpose set forth.

6. In a drive-chain coupling, the combination with a link removable from its transverse pins or bars, of a key or clencher located at the outside of said link and engaging the ends of both of said bars for holding said link in place.

7. A chain comprising links, grooved pins, and auxiliary fastening-plates formed to engage the grooved pins and having projections engaging indentations in the main links.

8. A chain comprising links, grooved pins, and auxiliary fastening devices, each fastening device being formed to engage adjacent grooved pins and provided with means for removably holding it in such engagement.

Signed at Trumansburg, in the county of Tompkins and State of New York, this 31st day of January, A. D. 1895.

EVERETT F. MORSE.

Witnesses:
FRANK L. MORSE,
ELLSWORTH H. FAY.